United States Patent [19]

Young

[11] Patent Number: 4,977,455
[45] Date of Patent: Dec. 11, 1990

[54] SYSTEM AND PROCESS FOR VCR SCHEDULING

[75] Inventor: Patrick Young, San Mateo, Calif.

[73] Assignee: Insight Telecast, Inc., Palo Alto, Calif.

[21] Appl. No.: 219,971

[22] Filed: Jul. 15, 1988

[51] Int. Cl.⁵ .................. H04N 7/087; H04N 7/04; G11B 27/02; H04H 1/00

[52] U.S. Cl. .................. 358/142; 358/146; 358/147; 358/335; 358/86; 455/68; 455/70; 455/186; 360/14.1; 360/69

[58] Field of Search .............. 358/84, 86, 142, 143, 358/144, 145, 146, 147, 194.1, 310, 335; 455/68, 70, 186, 2.4; 360/14.1, 69

[56] References Cited

U.S. PATENT DOCUMENTS

| | | | |
|---|---|---|---|
| 4,305,101 | 12/1981 | Yarbrough | 360/69 |
| 4,701,794 | 10/1987 | Fröling et al. | 358/146 |
| 4,821,102 | 4/1989 | Ischikawa et al. | 358/183 |
| 4,908,713 | 3/1990 | Levine | 358/335 |

FOREIGN PATENT DOCUMENTS

| | | |
|---|---|---|
| WO880457 | 6/1988 | PCT Int'l Appl. . |
| 2185670 | 7/1987 | United Kingdom . |
| 2207314 | 1/1989 | United Kingdom . |

OTHER PUBLICATIONS

Mangold, Publ. German Application 2,918,846, filed May 10, 1979, disclosed 11-13-80.

"VPV-Videotext Programs Videorecorder", by Bensch, IEEE Jun. 1988, pp. 788-792.

Primary Examiner—John W. Shepperd
Assistant Examiner—Michael D. Parker
Attorney, Agent, or Firm—Flehr, Hohbach, Test, Albritton & Herbert

[57] ABSTRACT

A VCR schedule controller receives broadcast data over antenna (1) or cable (2) by a programmable tuner (3), which is connected to a teletext receiver (4). The teletext receiver (4) is connected to a microprocessor (5). Microprocessor output (11) is connected to a video display generator (10), used to create text for television receiver (60) to display a message from the microprocessor (5). After processing embedded data in a broadcast, the microprocessor (5) generates a cue for display on TV receiver (60). Remote control receiver (20) receives a command from a remote controller (22) from a viewer input in response to the cue. Remote control receiver (20) supplies a control signal to cause the microprocessor to store the embedded data in memory (9). The microprocessor then issues a message to the display generator (10) as an acknowledgement of the viewer input. The microprocessor (5) monitors the system clock (6) and compares it with stored schedules from the embedded supplemental data. When the system time corresponds to one of the scheduled times, the microprocessor (5) sets the programmable tuner (3) to the stored channel and initiates recording on VCR (30).

24 Claims, 2 Drawing Sheets

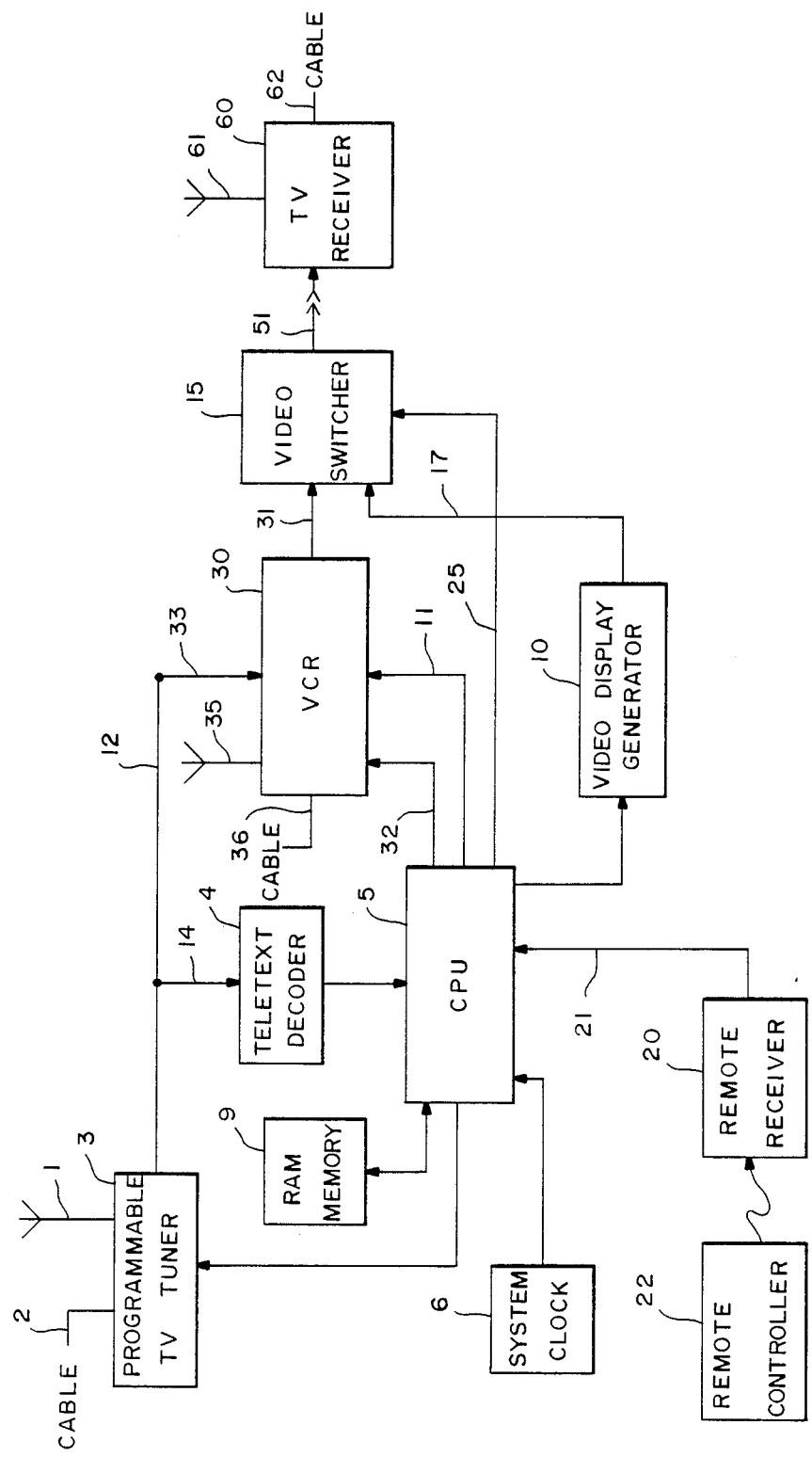
FIG.—1

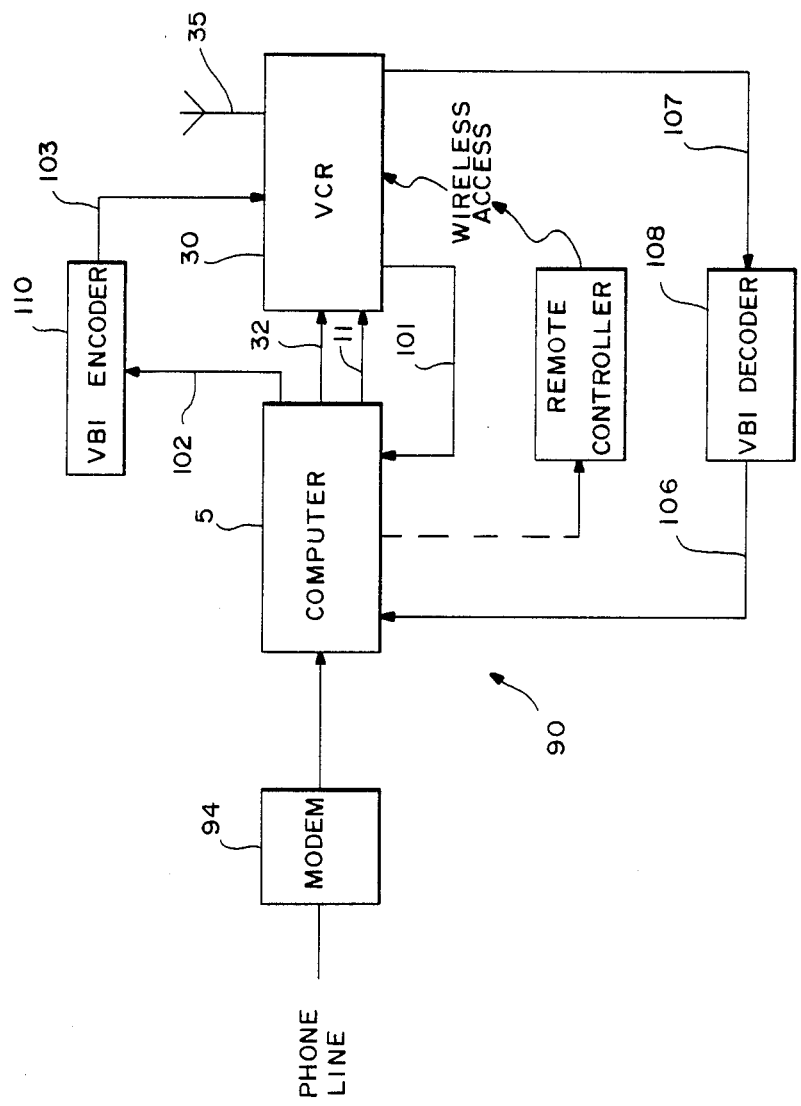
FIG.—2

SYSTEM AND PROCESS FOR VCR SCHEDULING

CROSS REFERENCE TO RELATED INVENTION

This invention relates to an improvement in the invention described in my earlier U.S. Pat. No. 4,706,121, issued Nov. 10, 1987 and entitled "TV Schedule System and Process."

BACKGROUND OF THE INVENTION

1. Field of the Invention

The present invention further relates generally to a system and process in which television supplemental data is embedded in a televised broadcast and, on cue, the viewer can store the supplemental data. Such supplemental data can include schedule information, such as time, channel, program name and program type. The stored data is used to program a VCR automatically for recording a supplemental televised program as defined by the schedule information.

2. Description of the Prior Art

The above-referenced related patent describes a system and process which allows user selection of broadcast programs from schedule information for presentation to a television set and/or recording by a VCR. The prior art discussed in that patent and of record in its application shows a variety of systems and processes for increasing the functionality of a television set and/or a VCR.

While a number of such systems and processes are known in this art, none of these systems and processes deal with a way to provide supplemental information about material being broadcast to a viewer. An example of such supplemental information that would be of substantial interest to certain viewers is further information on a product that is advertised during a regular broadcast. Such commercial time is very expensive, particularly during prime time or televised sporting events with very large audiences, so that commercials have a typical length of from 30 seconds to one minute. For many advertised products, viewers need more information than can be provided during the commercials on, for example, features, prices and local availability before they make a decision to purchase the product. The ability to provide such supplemental information selectively to viewers who desire it would be of substantial value to advertisers and other suppliers of televised information.

SUMMARY OF THE INVENTION

Accordingly, it is an object of this invention to provide a system and process which will allow a viewer to select interactively to receive supplemental information related to material in a television broadcast.

It is another object of the invention to provide such a system and process which will provide the supplemental information for recording when broadcast time is inexpensive.

It is a further object of the invention to provide such a system and process which will allow viewers to select supplemental information from a menu.

It is another object of the invention to provide a VCR schedule controller that provides an improved index of recorded material on a tape.

The attainment of these and related objects may be achieved through use of the novel system and process for VCR scheduling herein disclosed. A system and process for VCR scheduling in accordance with this invention has a recording device, a broadcast receiver and a data processor connected to the recording device and to the broadcast receiver. The data processor includes means for presenting a cue on the broadcast receiver during the broadcast. A means is connected to the data processor for receiving a user response to the cue. A means responsive to the user response to the cue controls the recording device to record the supplemental information.

A process for presenting supplemental information about a broadcast in accordance with the invention includes providing a cue during a broadcast indicating the availability of supplemental information relating to the broadcast. A response to the cue is received from the user. The supplemental information is supplied to the user after receiving the cue response from the user. Preferably, the supplemental information is broadcast at a later time. Schedule information for the supplemental information is provided with the broadcast. The schedule information is stored after the user response to the cue and used to record the supplemental information with a recording device when the supplemental information is broadcast.

This apparatus allows supplemental information to be delivered to the viewer selectively, at a time that is beneficial and convenient for broadcasters, and retrieved by the viewer in a prompt and convenient way. One method of sending supplemental data is using the video blanking interval (VBI) segment of the video signal to carry teletext-formatted data. A teletext receiver-based apparatus is used to decode the supplemental data.

The cue may be a caption on the screen, an audio signal or message, an indicator on the apparatus, or anything that can alert the viewer. The cue may be generated selectively by the apparatus, based on the content of the supplemental data received, or the cue may be contained in the normal televised video picture or sound. The viewer responds to the cue by pushing a key on a remote controller, by a switch on the apparatus, by making a loud sound, or by any other means that will activate the system to store the supplemental data in memory.

When the viewer successfully stores the data on cue, the system may issue an acknowledgement. This may be another caption, an audio signal or message, or anything else to inform the viewer that the response to the cue has been entered. The system will then automatically tune the VCR to the scheduled channel and time defined by the supplemental data.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a block diagram of a system for VCR scheduling in accordance with the invention.

FIG. 2 is a block diagram of another system for VCR scheduling in accordance with the invention.

DETAILED DESCRIPTION OF THE INVENTION

Turning now to the drawings, more particularly to FIG. 1, there is shown a block diagram of an integrated VCR schedule controller in accordance with the invention. In this embodiment, the controller is provided built into a VCR, but it can also be provided separate from the VCR, such as by using the remote facility of the VCR to provide inputs to the VCR.

Broadcast data is received over antenna 1 or cable 2 by a programmable tuner 3, which has an output connected to input 14 of a teletext receiver 4. The teletext receiver may be a Sears Caption Decoder. The output of the teletext receiver 4 is connected to a microprocessor 5. Microprocessor output 11 is connected to a video display generator 10, used to create text for television receiver 60. Video switcher 15 connects the display generator 10 output 17 to the TV receiver 60 to display a message from the microprocessor 5.

The microprocessor 5 has a random access memory 9 and a system clock/calendar 6. After processing the embedded data, the microprocessor 5 generates a cue by outputting a symbol or message to the display generator 10 for display on TV receiver 60. Remote control receiver 20 receives a command from a remote controller 22 from a viewer input in response to the cue. Remote control receiver 20 is connected to an input line 21 and supplies a control signal to cause the microprocessor to store the embedded data in memory 9. The microprocessor then issues a message to the display generator 10 as an acknowledgement of the viewer input.

The cue can be implemented in many ways other than through the microprocessor 5. The simplest is an audio or visual stimulus that is part of the sound or video portion of the broadcast. In this case, both the display generator 10 and the video switcher 15 are unnecessary. The provision of the cue separate from the sound or video portion of the broadcast, such as in the VBI, which is then added to the sound or video portion of the signal provided to the TV receiver 60 by the microprocessor, is not distracting to viewers without the system of this invention.

The microprocessor 5 monitors the system clock 6 and compares it with the stored schedules from the embedded supplemental data. When the system time corresponds to one of the scheduled times, the microprocessor 5 sets the programmable tuner 3 to the stored channel and initiates recording on VCR 30 by a control signal on line 32. The VCR receives its signal from antenna 35 or cable 36.

In addition to obtaining schedule information as part of a broadcast, in a system 90 as shown in FIG. 2, the schedule information can be received by a computer 5 using a modem 94 and processed by the computer 5. Based on user selections, one or more program schedule listings is stored in computer memory. At the time of the broadcasts, the computer 5 activates a VCR 30 for recording of the selected programs. Serial output port 32 of the computer 5 connects to a control bus of the VCR 30 to turn on the VCR, control channel selection and enable recording of the program.

The system 90 incorporates a feature for automatically converting television guide station listings to channel selections for cable users. To eliminate need to convert station listings to local channel numbers each time the VCR 30 is to be programmed for unattended recording, a memory is provided so that the user only needs to enter the conversion once. After that, the conversion is handled by the computer 5. An entry table is provided on-screen requesting the user to enter a cable channel number corresponding to each station name or number. Alternatively, both the station name or number and the cable number may be read from a bar-code conversion guide, using a bar-code reader. In either method, the conversion data is stored in a table in memory. During unattended recording, the channel number corresponding to the station name is used by the computer 5 to control channel selection on the VCR 30. With such a conversion stored locally in the system 90, cable schedule information can be supplied under cable channel names (e.g., ESPN) on a regional or national basis and selection of the appropriate local channel number for that cable service made by the controller 90.

The system 90 uses electronic indexing for automatic retrieval of programs. During recording, the location of the program is identified by a capstan counter with a digital readout. This index information identifying where a program to be recorded is stored into a log along with the name of the program. During playback, the VCR 30 will automatically go to the indexed location and start playback.

Line 101 from the VCR 30 is a serial bus containing the index data. It is connected to a serial input port of the computer 5. Search is made by comparing the present index value and the stored index value. Search is completed when the index value from the VCR 30 matches the stored index value.

The system 90 also provides self-indexed cassette recordings. At the start of each cassette tape, a complete description of the start and end positions of every program recorded on the cassette is stored along with the program names. During playback, this information is read by the teletext decoder of the VCR 30 and presented on the screen, allowing the user to identify quickly what is recorded and to access the desired program automatically. Access is made by name selection from the log.

During recording, a complete log is created for each tape as described above. Before the tape is removed from the VCR 30, the tape is rewound to the start, and the log information is recorded onto video blanking interval (VBI) tracks of the tape using a VBI data encoder 110 of the type described in my above-referenced issued patent. Line 102 is a serial output from the computer 5 to the VBI encoder 110 and line 103 is the video signal with the embedded log information connecting to the video input port of the VCR 30. While the log information is recorded, the VCR 30 receives its signals from the antenna input 35 to the video input.

During playback, a VBI teletext decoder 108 receives data from the VCR on line 107, which is the video output port of VCR 30. After decoding, the data is received on line 106 by computer 5 on a second input port. Other than as shown and described, the construction and operation of the FIG. 2 embodiment of the invention is the same as that of the FIG. 1 embodiment.

Further details on implementing systems of this invention are available in my above-referenced issued patent, the disclosure of which is incorporated by reference herein.

It should now be apparent to those skilled in the art that a novel VCR schedule system and process capable of achieving the stated objects of the invention has been provided. The system and process allows interactive selection by a viewer of further information related to information being broadcast, which may be made with a menu selection. The further information can be broadcast for recording by a viewer at a different time, when broadcast time is less costly and/or underutilized.

It should further be apparent to those skilled in the art that various changes in form and details of the invention as shown and described may be made. It is intended that such changes be included within the spirit and scope of the claims appended hereto.

What is claimed is:

1. A system to allow interactive selection for presentation to a user of supplemental broadcast information pertaining to a primary broadcast, which comprises a recording device, a broadcast receiver, a data processor connected to said recording device and to said broadcast receiver, said data processor including means responsive to a cue broadcast at a first time with, and in addition to, a program comprising the primary broadcast for presenting the cue on the broadcast receiver during, and simultaneous with presenting the primary broadcast on the receiver, the cue indicating the availability at a second time later than the first time of the supplemental broadcast information pertaining to the primary broadcast, means connected to the data processor for receiving a user response to the cue, and means responsive to the user response to the cue for controlling said recording device to record the supplemental broadcast information at the second time.

2. The system to allow interactive selection for presentation to a user of supplemental broadcast information pertaining to a primary broadcast of claim 1 in which schedule information for the supplemental broadcast information is provided with the primary broadcast, and said data processor is configured to store the schedule information in response to the user response to the cue and to use the schedule information to record the supplemental broadcast information with said recording device when the supplemental broadcast information is broadcast.

3. The system to allow interactive selection for presentation to a user of supplemental broadcast information pertaining to a primary broadcast of claim 2 in which said recording device is a video cassette recorder and said broadcast received is a television set.

4. The system to allow interactive selection for presentation to a user of supplemental broadcast information pertaining to a primary broadcast of claim 1 in which said data processor is further configured to provide acknowledgment to the user of the user response to the cue.

5. The system to allow interactive selection for presentation to a user of supplemental broadcast information pertaining to a primary broadcast of claim 1 in which said data processor is further configured to provide a menu display to the user in response to a user response to the cue and to receive user menu selections.

6. The system to allow interactive selection for presentation to a user of supplemental broadcast information pertaining to a primary broadcast of claim 1 in which said system includes means for creating and storing an index of recorded material.

7. The system to allow interactive selection for presentation to a user of supplemental broadcast information pertaining to a primary broadcast of claim 6 in which said system includes means for recording the index on a tape including the recorded material.

8. A system for recording and indexing broadcast information, which comprises a recording device for receiving and recording the broadcast information, means for receiving and storing schedule information, a data processor connected to said recording device, said data processor including means for creating and storing an index of location and identification of recorded broadcast information from index inputs received from the schedule information and from said recording device, said system including a memory for storing information identifying a local channel number on which a cable channel is supplied.

9. A system for recording and indexing broadcast information, which comprises a recording device for receiving and recording the broadcast information, a data processor connected to said recording device, said data processor including means for creating and storing an index of recorded broadcast information, said system including means for recording the index on a recording medium including the recorded material, said system including a memory for storing information identifying a local channel number on which a cable channel is supplied.

10. The system for recording and indexing broadcast information of claim 9 in which said system includes means for selecting broadcast information for recording from schedule information and said means for creating and storing the index is configured to compile the index from the schedule information.

11. A process to allow interactive selection for presentation to a user of supplemental broadcast information pertaining to a primary television broadcast, which comprises broadcasting a cue during and in addition to the broadcast at a first time, providing the cue to the user during, and simultaneous with showing of the primary broadcast, the cue indicating the availability at a second time later than the first time of supplemental broadcast information relating to the primary broadcast, receiving a response to the cue from the user, and supplying the supplemental broadcast information to the user at the second time after receiving the cue response from the user.

12. The process to allow interactive selection for presentation to a user of supplemental broadcast information pertaining to a primary broadcast of claim 11 in which schedule information for the supplemental broadcast information is provided with the primary broadcast, the process further comprising storing the schedule information after the user response to the cue and using the schedule information to record the supplemental broadcast information with a recording device when the supplemental broadcast information is broadcast.

13. The process to allow interactive selection for presentation to a user of supplemental broadcast information pertaining to a primary broadcast of claim 11 additionally comprising providing acknowledgment to the user of the user response to the cue.

14. The process to allow interactive selection for presentation to a user of supplemental broadcast information pertaining to a primary broadcast of claim 11 additionally comprising providing a menu display to the user in response to a user response to the cue, receiving user menu selections, and supplying the supplemental broadcast information in accordance with the user menu selections.

15. The process to allow interactive selection for presentation to a user of supplemental broadcast information pertaining to a primary broadcast of claim 11 additionally comprising creating and storing an index of recorded material.

16. The process to allow interactive selection for presentation to a user of supplemental broadcast information pertaining to a primary broadcast of claim 15 additionally comprising recording the index on a tape including the recorded material.

17. A process for recording and indexing broadcast information, which comprises receiving a user input identifying a local channel number on which a cable channel is received, storing information corresponding to the user input identifying the local channel number on which the cable channel is supplied, receiving and recording the broadcast information, creating and storing an index of recorded broadcast information, and recording the index on a recording medium including the recorded material.

18. The process for recording and indexing broadcast information of claim 17 additionally comprising selecting broadcast information for recording from schedule information and in which the index is created from the schedule information.

19. The system of claim 8 in which said means for creating and storing an index is configured to store at least a title of the broadcast information as the index input from the schedule information.

20. The system of claim 19 in which said means for creating and storing an index is configured to store at least a numeric location of the recorded information as the index input from the recording device.

21. The system to allow interactive selection for presentation of a user of supplemental broadcast information pertaining to a primary broadcast of claim 1 additionally comprising a memory, said data processor being configured to store information identifying a local channel number on which a cable channel is supplied in said memory.

22. The system to allow interactive selection for presentation of a user of supplemental broadcast information pertaining to a primary broadcast of claim 1 in which the primary broadcast is an advertisement and the supplemental broadcast information is further details about the subject of the advertisement.

23. The process to allow interactive selection for presentation of a user of supplemental broadcast information pertaining to a primary broadcast of claim 11 additionally comprising the steps of receiving a user input identifying a local channel number on which a cable channel is supplied, and storing the local number on which a cable channel is supplied.

24. The process to allow interactive selection for presentation of a user of supplemental broadcast information pertaining to a primary broadcast of claim 11 in which the broadcast is an advertisement and the supplemental information is further details about the subject of the advertisement.

* * * * *

REEXAMINATION CERTIFICATE (1976th)

United States Patent [19]

Young

[11] B1 4,977,455

[45] Certificate Issued Apr. 13, 1993

[54] SYSTEM AND PROCESS FOR VCR SCHEDULING

[75] Inventor: Patrick Young, San Mateo, Calif.
[73] Assignee: Insight Telecast, Inc., San Mateo, Calif.

Reexamination Request:
No. 90/002,678, Mar. 20, 1992

Reexamination Certificate for:
Patent No.: 4,977,455
Issued: Dec. 11, 1990
Appl. No.: 219,971
Filed: Jul. 15, 1988

[51] Int. Cl.⁵ .................. H04N 7/087; H04N 7/04; H04N 1/00; G11B 27/02
[52] U.S. Cl. ........................ 358/142; 358/146; 358/147; 358/335; 358/86; 455/68; 455/70; 455/186.1; 360/14.1; 360/69; 968/977; 968/DIG. 1
[58] Field of Search ............... 358/142, 146, 147, 335, 358/86; 455/186.1; 360/14.1, 69

[56] References Cited

U.S. PATENT DOCUMENTS

| | | |
|---|---|---|
| 4,031,548 | 6/1977 | Kato et al. |
| 4,081,753 | 3/1978 | Miller |
| 4,170,782 | 10/1979 | Miller |
| 4,186,413 | 1/1980 | Mortimer |
| 4,288,809 | 9/1981 | Yabe |
| 4,305,101 | 12/1981 | Yarbrough et al. |
| 4,381,522 | 4/1983 | Lambert |
| 4,388,179 | 6/1983 | Kruger et al. |
| 4,390,901 | 6/1983 | Kelser ............... 358/147 |
| 4,405,946 | 9/1983 | Knight |
| 4,429,385 | 1/1984 | Cichelli et al. |
| 4,436,791 | 8/1985 | Campbell et al. |
| 4,598,288 | 7/1986 | Yarbrough et al. |
| 4,641,205 | 2/1987 | Beyers, Jr. |
| 4,677,466 | 6/1987 | Lert, Jr. et al. |
| 4,689,022 | 8/1987 | Peers et al. |
| 4,706,121 | 11/1987 | Young |
| 4,712,105 | 12/1987 | Kohler |
| 4,751,578 | 6/1988 | Reiter et al. |
| 4,754,326 | 6/1988 | Kram et al. |
| 4,775,935 | 10/1988 | Yourick |
| 4,787,063 | 11/1988 | Muguet |
| 4,890,321 | 12/1989 | Seth-Smith et al. |
| 4,894,789 | 1/1990 | Yee ............... 364/521 |
| 4,908,713 | 3/1990 | Levine |
| 4,963,994 | 10/1990 | Levine |

FOREIGN PATENT DOCUMENTS

| | | |
|---|---|---|
| 2126002 | 3/1484 | United Kingdom |
| 2034995 | 10/1979 | United Kingdom |
| 2207314 | 1/1989 | United Kingdom |

OTHER PUBLICATIONS

Merrell, "Tac Timer," 1986 NCTA Technical Papers, pp. 203-206.
James, "Oracle-Broadcasting the Written Word," Wireless World, Jul. 1973, pp. 314-316.
Carnes, "The Wired Household," IEEE Spectrum, Oct. 1979, pp. 61-66.
McKenzie, "Oracle-An Information Broadcasting Service Using Data Transmission in the Vertical Interval," Journal of the SMPTE, Jan. 1974, pp. 6-10.
Edwardian, "CEEFAX-A Proposed New Broadcasting Service,"Journal of the SMPTE, Jan. 1974, pp. 14-19.

*Primary Examiner*—James J. Groody

[57] ABSTRACT

A VCR schedule controller receives broadcast data over antenna (1) or cable (2) by a programmable tuner (3), which is connected to a teletext receiver (4). The teletext receiver (4) is connected to a microprocessor (5). Microprocessor output (11) is connected to a video display generator (10), used to create text for television receiver (60) to display a message from the microprocessor (5). After processing embedded data in a broadcast, the microprocessor (5) generates a cue for display on TV receiver (60). Remote control receiver (20) receives a command from a remote controller (22) from a viewer input in response to the cue. Remote control receiver (20) supplies a control signal to cause the microprocessor to store the embedded data in memory (9). The microprocessor then issues a message to the display generator (10) as an acknowledgement of the viewer input. The microprocessor (5) monitors the system clock (6) and compares it with stored schedules from the embedded supplemental data. When the system time corresponds to one of the scheduled times, the microprocessor (5) sets the programmable tuner (3) to the stored channel and initiates recording on VCR (30).

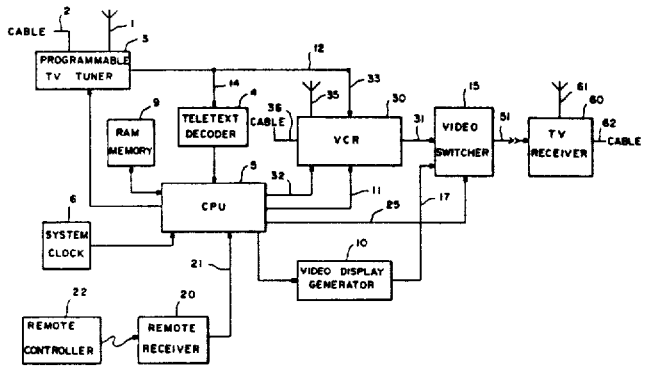

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentablility of claims 1-24 is confirmed.

* * * * *